(12) United States Patent
Horvath

(10) Patent No.: US 9,263,013 B2
(45) Date of Patent: Feb. 16, 2016

(54) SYSTEMS AND METHODS FOR ANALYZING MELODIES

(71) Applicant: Ralph Horvath, Falls Church, VA (US)

(72) Inventor: Ralph Horvath, Falls Church, VA (US)

(73) Assignee: SKIPTUNE, LLC, Falls Church, VA (US)

( * ) Notice: Subject to any disclaimer, the term of this patent is extended or adjusted under 35 U.S.C. 154(b) by 44 days.

(21) Appl. No.: 14/266,199

(22) Filed: Apr. 30, 2014

(65) Prior Publication Data

US 2015/0317965 A1 Nov. 5, 2015

(51) Int. Cl.
*G10H 1/00* (2006.01)
*G10H 1/38* (2006.01)
*G10H 7/00* (2006.01)
*G06F 17/30* (2006.01)

(52) U.S. Cl.
CPC .............. *G10H 1/0025* (2013.01); *G06F 17/30* (2013.01); *G10H 1/00* (2013.01); *G10H 1/0008* (2013.01); *G10H 1/0041* (2013.01); *G10H 1/38* (2013.01); *G10H 7/00* (2013.01); *G10H 2210/161* (2013.01)

(58) Field of Classification Search
CPC ..... G10H 1/00; G10H 1/0025; G10H 1/0008; G10H 1/0041; G10H 1/38; G10H 7/00; G06F 17/30
USPC .................................................... 84/609, 613
See application file for complete search history.

(56) References Cited

U.S. PATENT DOCUMENTS

| | | | | |
|---|---|---|---|---|
| 4,982,643 A * | 1/1991 | Minamitaka | ......... | G10H 1/0025 706/902 |
| 5,088,380 A * | 2/1992 | Minamitaka | ............ | G10H 1/38 84/637 |
| 6,031,171 A * | 2/2000 | Tohgi | ..................... | G09B 15/04 84/470 R |
| 6,121,532 A * | 9/2000 | Kay | ......................... | G10H 1/00 84/445 |
| 6,124,543 A * | 9/2000 | Aoki | .................... | G10H 1/0025 84/609 |
| 6,188,010 B1 * | 2/2001 | Iwamura | ............... | G09B 15/00 84/477 |
| 6,225,546 B1 * | 5/2001 | Kraft | ....................... | G10H 1/00 700/94 |
| 6,570,080 B1 * | 5/2003 | Hasegawa | ............. | G06Q 30/06 434/307 A |
| 6,678,680 B1 * | 1/2004 | Woo | .................. | G06F 17/30743 |
| 7,026,535 B2 * | 4/2006 | Eruera | ................. | G10H 1/0025 84/609 |
| 7,250,567 B2 * | 7/2007 | Gayama | ................... | G10H 1/00 84/609 |
| 7,378,588 B1 * | 5/2008 | Changfan | ........ | G06F 17/30743 84/609 |

(Continued)

FOREIGN PATENT DOCUMENTS

| | | |
|---|---|---|
| JP | 4-9893 | 1/1992 |
| JP | 5-61917 | 3/1993 |

(Continued)

*Primary Examiner* — David Warren
*Assistant Examiner* — Christina Schreiber
(74) *Attorney, Agent, or Firm* — Finnegan, Henderson, Farabow, Garrett & Dunner, L.L.P.

(57) ABSTRACT

In one embodiment, a system for analyzing melodies is disclosed that may receive data for a musical composition, the data including a sequence of notes that make up a melody contained in the musical composition, and store, in a database, a pitch and a duration for at least one note in the sequence of notes in association with the melody. In addition, the system may determine at least one pitch differential and at least one duration ratio for at least two consecutive notes in the sequence of notes, and store, in the database, the at least one pitch differential and the at least one duration ratio in association with the melody. The system may also generate at least one metric associated with the melody based on the at least one pitch differential and/or the at least one duration ratio.

5 Claims, 15 Drawing Sheets

(56) References Cited

U.S. PATENT DOCUMENTS

| | | | | |
|---|---|---|---|---|
| 7,743,092 | B2* | 6/2010 | Wood | G10H 1/0058 704/246 |
| 7,962,530 | B1* | 6/2011 | Kolta | G06F 17/30017 707/756 |
| 8,283,546 | B2* | 10/2012 | van Os | G06F 17/30743 84/600 |
| 9,082,382 | B2* | 7/2015 | Akiyama | G10H 7/008 |
| 2002/0023529 | A1* | 2/2002 | Kurakake | G10H 1/0025 84/610 |
| 2003/0089216 | A1* | 5/2003 | Birmingham | G10H 1/0041 84/609 |
| 2003/0131715 | A1* | 7/2003 | Georges | G10H 1/0025 84/609 |
| 2006/0137516 | A1* | 6/2006 | Kim | G10H 1/0008 84/612 |
| 2010/0251876 | A1* | 10/2010 | Wilder | G10H 1/0008 84/609 |
| 2010/0307321 | A1* | 12/2010 | Mann | G06F 3/0481 84/613 |
| 2011/0259179 | A1* | 10/2011 | Oertl | G10H 1/0066 84/609 |
| 2013/0275421 | A1* | 10/2013 | Resch | G10H 1/0008 707/725 |
| 2014/0164454 | A1* | 6/2014 | Zhirkov | H03M 7/55 707/829 |
| 2014/0174279 | A1* | 6/2014 | Wong | G10H 1/0025 84/609 |
| 2015/0013533 | A1* | 1/2015 | Buskies | G10H 1/0066 84/645 |

FOREIGN PATENT DOCUMENTS

| | | |
|---|---|---|
| JP | 2958795 | 10/1999 |
| JP | 2007-71903 | 3/2007 |

* cited by examiner

```
\header {title = "Aura Lee"}
\relative c'
{
    \key g \major
    \time 4/4
    d4 g fis g a e a2 g4 fis e fis g1 d4 g fis g a e a2 g4
fis e fis g1 b4 b b2 b4 b b2 b4 a g a b1 b4 b c b a e a g g
fis b a g1
}
```

Baa, Baa, Black Sheep|0|F|1761|Nursery|trad|110|4/4|NA||65 4 65 4 72 4 72 4 74 2
74 2 74 2 74 2 72 8 70 4 70 4 69 4 69 4 67 4 67 4 65 8 65 4 65 2 65 2
72 4 72 2 72 2 74 4 74 2 74 2 72 6 72 2 70 4 70 2 70 2 69 2 69 2 69 2
69 2 67 4 67 2 67 2 65 8

Where Is Thumbkin? & Frere Jacques & Brother John & Are You
Sleeping?|1|F|1780|Nursery|trad|110|4/4|GSB||65 4
67 4 69 4 65 4 67 4 69 4 65 4 69 4 70 4 72 8 69 4 70 4 72 8 72 2
74 2 72 2 70 2 69 4 65 4 72 2 74 2 72 2 70 2 69 4 65 4 65 4 60 4 65 8
65 4 60 4 65 8

A-Hunting We Will Go|2|D|1777|Nursery|Folk|Opera|6/8|NA||0
10 69 2 74 4 74 2 74 4 74 2 74 6 0 4 76 2 78 4 78 2 78 4 78 2 78 6 0 4
79 2 81 4 81 2 81 4 69 2 81 1 81 1 81 2 81 2 81 4 79 2 78 4 74 2 76 4
73 2 74 6 0 6

FIGURE 7

| PATTERNS | MELODY ID NUMBERS | LOCATIONS OF PATTERNS |
|---|---|---|
| [0, 1.0] | [0, 1, 2] | [[1, 3, 5, 6, 7, 10, 12, 14, 18, 21, 24, 29, 31, 32, 33, 36], [4, 26], [21, 23]] |
| [7, 1.0] | [0] | [[2]] |
| [2, 0.5] | [0] | [[4]] |
| [-2, 4.0] | [0] | [[8, 37]] |
| [-2, 0.5] | [0, 2] | [[9], [25]] |
| [1, 1.0] | [0] | [[11, 30]] |
| [-2, 1.0] | [0, 1] | [[13], [16, 17, 22, 23]] |
| [-2, 2.0] | [0] | [[15, 27, 34]] |
| [0, 0.5] | [0, 1, 2] | [[16, 17, 20, 23, 28, 35], [29], [3, 5, 10, 12, 17]] |
| [7, 2.0] | [0] | [[19]] |
| [2, 2.0] | [0, 1, 2] | [[22], [10, 13], [9, 16, 28]] |
| [-2, 3.0] | [0] | [[25]] |
| [0, 0.333] | [0] | [[26]] |
| [2, 1.0] | [1] | [[1, 2, 5, 6, 15, 21]] |
| [-4, 1.0] | [1] | [[3, 7, 19, 25]] |
| [4, 1.0] | [1] | [[8]] |
| [1, 1.0] | [1] | [[9, 12]] |
| [-3, 0.5] | [1] | [[11], [29]] |
| [0, 0.25] | [1] | [[14]] |
| [-1, 2.0] | [1, 2] | [[18, 24], [26]] |
| [7, 0.5] | [1] | [[20]] |
| [-5, 1.0] | [1] | [[27, 30]] |
| [5, 2.0] | [1] | [[28, 31], [2]] |
| [32, 0.2] | [2] | [[1]] |
| [0, 2.0] | [2] | [[4, 11, 18, 22, 24]] |
| [0, 3.0] | [2] | [[6, 13]] |
| [-32, 0.667] | [2] | [[7, 14]] |
| [32, 0.5] | [2] | [[8, 15]] |
| [-12, 0.5] | [2] | [[19]] |
| [12, 0.5] | [2] | [[20]] |
| [-4, 0.5] | [2] | [[27]] |
| [1, 3.0] | [2] | [[30]] |
| [-32, 1.0] | [2] | [[31]] |

FIGURE 8

Analysis of Irish Tunes v. English Tunes

| Test | Irish Mean(n)(SD) | english Mean(n)(SD) | Means Diff | SE | DF | t | t* | Signif |
|---|---|---|---|---|---|---|---|---|
| PattPerNotes% | 34.3(19)(14.04) | 37.2(29)(12.89) | -2.94 | 4.01 | 36 | 0.73 | 2.03 | N |
| OncePatt% | 39.5(19)(14.68) | 39.8(29)(15.25) | -0.28 | 4.4 | 40 | 0.06 | 2.02 | N |
| OncePatt%Notes | 15.2(19)(11.89) | 16.5(29)(12.13) | -1.27 | 3.54 | 39 | 0.36 | 2.02 | N |
| AvNonAural | 2.35(19)(0.58) | 2.25(29)(0.67) | 0.1 | 0.18 | 43 | 0.55 | 2.02 | N |
| AvAural | 2.35(19)(0.58) | 2.29(29)(0.67) | 0.06 | 0.18 | 42 | 0.35 | 2.02 | N |
| Av#Freq | 3.47(19)(1.05) | 3.45(29)(1.43) | 0.02 | 0.36 | 45 | 0.06 | 2.01 | N |
| Av#Uq | 0.11(19)(0.32) | 0.03(29)(0.19) | 0.071 | 0.08 | 26 | 0.88 | 2.06 | N |
| Av%Uq | 10.53(19)(31.63) | 3.45(29)(18.57) | 7.08 | 8.01 | 26 | 0.88 | 2.06 | N |
| RangeAv | 15.4(19)(2.99) | 13.6(29)(3.94) | 1.82 | 1.0 | 45 | 1.81 | 2.01 | N |
| DurRAv | 1.32(19)(0.33) | 1.23(29)(0.14) | 0.086 | 0.08 | 22 | 1.06 | 2.07 | N |
| Av#Runs/Note | 0.47(19)(0.12) | 0.47(29)(0.08) | 0.006 | 0.03 | 30 | 0.2 | 2.04 | N |
| AvRunLen | 2.19(19)(0.51) | 2.15(29)(0.42) | 0.04 | 0.14 | 33 | 0.28 | 2.04 | N |
| maxRunLenAv | 5.05(19)(1.08) | 4.76(29)(1.21) | 0.294 | 0.33 | 42 | 0.88 | 2.02 | N |
| AvDur1% | 52.65(19)(22.59) | 47.37(29)(26.31) | 5.282 | 7.12 | 43 | 0.74 | 2.02 | N |
| AvPit0% | 15.41(19)(12.08) | 14.99(29)(11.12) | 0.425 | 3.46 | 36 | 0.12 | 2.03 | N |
| AvMoFrqSD | 3.33(19)(0.5) | 3.01(29)(0.93) | 0.318 | 0.21 | 45 | 1.53 | 2.01 | N |
| AvTuFrqSD | 2.67(19)(0.32) | 2.73(29)(0.78) | -0.056 | 0.16 | 40 | 0.35 | 2.02 | N |
| AvPU | 2.21(19)(1.99) | 1.31(29)(1.71) | 0.9 | 0.56 | 35 | 1.62 | 2.03 | N |
| AvPU% | 16.67(19)(13.54) | 9.77(29)(12.41) | 6.897 | 3.87 | 36 | 1.78 | 2.03 | N |
| Av#Rests%Note | 0.009(19)(0.089) | 0.02(29)(0.027) | -0.01 | 0.005 | 36 | 1.84 | 2.03 | N |
| AvToRestR | 0.252(19)(0.284) | 0.32(29)(0.358) | -0.064 | 0.093 | 44 | 0.69 | 2.02 | N |
| AvFmRestR | 0.131(19)(0.15) | 0.25(29)(0.369) | -0.122 | 0.077 | 40 | 1.6 | 2.02 | N |

FIGURE 11

Analysis of Irish Tunes v. American Tunes

| Test | american Mean(n)(SD) | irish Mean(n)(SD) | Means Diff | SE | DF | t | t* | Signif |
|---|---|---|---|---|---|---|---|---|
| PattPerNotes% | 41.2(44)(13.47) | 34.3(19)(14.04) | 6.96 | 3.81 | 33 | 1.83 | 2.04 | N |
| OncePatt% | 46.7(44)(14.81) | 39.5(19)(14.68) | 7.21 | 4.04 | 35 | 1.78 | 2.03 | N |
| OncePatt%Notes | 21.0(44)(13.26) | 15.2(19)(11.89) | 5.74 | 3.38 | 38 | 1.7 | 2.03 | N |
| AvNonAural | 2.02(44)(0.44) | 2.35(19)(0.58) | -0.33 | 0.15 | 27 | 2.25 | 2.05 | Y |
| AvAural | 2.05(44)(0.44) | 2.35(19)(0.58) | -0.3 | 0.15 | 27 | 2.02 | 2.05 | N |
| Av%Freq | 3.45(44)(1.08) | 3.47(19)(1.05) | -0.02 | 0.29 | 35 | 0.07 | 2.03 | N |
| Av#Uq | 0.25(44)(0.72) | 0.11(19)(0.32) | -0.145 | 0.13 | 61 | 1.11 | 2.0 | N |
| Av%Uq | 15.91(44)(37.0) | 10.53(19)(31.53) | 5.38 | 9.13 | 40 | 0.59 | 2.02 | N |
| RangeAv | 14.0(44)(9.78) | 15.4(19)(2.99) | -1.37 | 1.63 | 57 | 0.84 | 2.0 | N |
| DurRAv | 1.36(44)(0.32) | 1.32(19)(0.33) | 0.046 | 0.09 | 33 | 0.51 | 2.04 | N |
| Av#Runs/Note | 0.49(44)(0.07) | 0.47(19)(0.12) | 0.014 | 0.03 | 24 | 0.48 | 2.06 | N |
| AvRunLen | 2.04(44)(0.31) | 2.19(19)(0.51) | -0.151 | 0.13 | 24 | 1.19 | 2.06 | N |
| maxRunLenAv | 4.36(44)(1.14) | 5.05(19)(1.88) | -0.689 | 0.3 | 36 | 2.28 | 2.03 | Y |
| AvDur1% | 46.7(44)(16.81) | 52.65(19)(22.59) | -5.95 | 5.77 | 27 | 1.03 | 2.05 | N |
| AvPit0% | 21.47(44)(12.0) | 15.41(19)(12.08) | 6.057 | 3.31 | 34 | 1.83 | 2.03 | N |
| AvNoFrqSD | 3.26(44)(0.65) | 3.33(19)(0.5) | -0.069 | 0.15 | 44 | 0.46 | 2.02 | N |
| AvTuFrqSD | 2.7(44)(0.5) | 2.67(19)(0.32) | 0.025 | 0.11 | 52 | 0.24 | 2.01 | N |
| AvPU | 2.18(44)(2.27) | 2.21(19)(1.99) | -0.029 | 0.57 | 39 | 0.05 | 2.02 | N |
| AvPU% | 16.67(44)(16.67) | 16.67(19)(13.54) | 0.0 | 3.99 | 42 | 0.0 | 2.02 | N |
| Av#Rests%Note | 0.031(44)(0.032) | 0.01(19)(0.009) | 0.022 | 0.005 | 55 | 4.19 | 2.0 | Y |
| AvToRestR | 0.337(44)(0.301) | 0.25(19)(0.284) | 0.085 | 0.079 | 36 | 1.07 | 2.03 | N |
| AvFmRestR | 0.367(44)(0.344) | 0.13(19)(0.15) | 0.236 | 0.062 | 61 | 3.79 | 2.0 | Y |

FIGURE 12

| Pattern | Freq. | No. of Melodies | % of Melodies | Uniqueness |
|---|---|---|---|---|
| [0, 1.000] | 20 | 3 | 100 | |
| [0, 0.500] | 12 | 3 | 100 | |
| [2, 2.000] | 6 | 3 | 100 | |
| [-2, 0.500] | 2 | 2 | 66 | |
| [-2, 1.000] | 5 | 2 | 66 | |
| [-3, 0.500] | 2 | 2 | 66 | |
| [-1, 2.000] | 3 | 2 | 66 | |
| [5, 2.000] | 3 | 2 | 66 | |
| [7, 1.000] | 1 | 1 | 33 | Tune 0 loc [2] |
| [2, 0.500] | 1 | 1 | 33 | Tune 0 loc [4] |
| [-2, 4.000] | 2 | 1 | 33 | Tune 0 loc [8, 37] |
| [-1, 1.000] | 2 | 1 | 33 | Tune 0 loc [11, 30] |
| [-2, 2.000] | 3 | 1 | 33 | Tune 0 loc [15, 27, 34] |
| [7, 2.000] | 1 | 1 | 33 | Tune 0 loc [19] |
| [-2, 3.000] | 1 | 1 | 33 | Tune 0 loc [25] |
| [0, 0.333] | 1 | 1 | 33 | Tune 0 loc [26] |
| [2, 1.000] | 6 | 1 | 33 | Tune 1 loc [1, 2, 5, 6, 15, 21] |
| [-4, 1.000] | 4 | 1 | 33 | Tune 1 loc [3, 7, 19, 25] |
| [4, 1.000] | 1 | 1 | 33 | Tune 1 loc [8] |
| [1, 1.000] | 2 | 1 | 33 | Tune 1 loc [9, 12] |
| [0, 0.250] | 1 | 1 | 33 | Tune 1 loc [14] |
| [7, 0.500] | 1 | 1 | 33 | Tune 1 loc [20] |
| [-5, 1.000] | 2 | 1 | 33 | Tune 1 loc [27, 30] |
| [32, 0.200] | 1 | 1 | 33 | Tune 2 loc [1] |
| [0, 2.000] | 5 | 1 | 33 | Tune 2 loc [4, 11, 18, 22, 24] |
| [0, 3.000] | 2 | 1 | 33 | Tune 2 loc [6, 13] |
| [-32, 0.667] | 2 | 1 | 33 | Tune 2 loc [7, 14] |
| [32, 0.500] | 2 | 1 | 33 | Tune 2 loc [8, 15] |
| [-12, 0.500] | 1 | 1 | 33 | Tune 2 loc [19] |
| [12, 0.500] | 1 | 1 | 33 | Tune 2 loc [20] |
| [-4, 0.500] | 1 | 1 | 33 | Tune 2 loc [27] |
| [1, 3.000] | 1 | 1 | 33 | Tune 2 loc [30]* |
| [-32, 1.000] | 1 | 1 | 33 | Tune 2 loc [31]* |

* Pattern is at the end of the melody

FIGURE 14

SYSTEMS AND METHODS FOR ANALYZING MELODIES

BACKGROUND

I. Field of the Invention

The following description of one or more embodiments relates to a field of musical analysis, and more particularly, to systems and methods for analyzing melodies.

II. Background Information

Musical compositions may be encoded, searched for, and classified using various techniques. For example, systems may search for and classify musical compositions based on interval changes between notes. However, these conventional systems may not provide reliable results. The disclosed embodiments are directed to providing systems and methods for encoding, analyzing, and classifying music, including melodies, that may provide more reliable results.

SUMMARY

The disclosed embodiments include a system for analyzing melodies. In one embodiment, the system may include a memory device storing software instructions, a database, and a processor configured to execute the software instructions. The processor may be configured to receive data for a musical composition, where the data includes a sequence of notes that make up a melody contained in the musical composition and may store, in the database, a pitch and a duration for at least one note in the sequence of notes, where the pitch and duration are stored in association with the melody. The processor may also be configured to determine at least one pitch differential and at least one duration ratio for at least two consecutive notes in the sequence of notes and may store, in the database, the at least one pitch differential and the at least one duration ratio for the at least two consecutive notes, where the at least one pitch differential and the at least one duration ratio are stored in association with the melody. The processor may further be configured to generate at least one metric associated with the melody based on at least one of the at least one pitch differential and the at least one duration ratio stored in association with the melody.

The disclosed embodiments include a system for identifying a unique pattern in a melody. In one embodiment, the system may include a memory device storing software instructions. The system may also include a database storing (i) a plurality of melodies, (ii) a plurality of 2-note patterns stored in association with the plurality of melodies, where each 2-note pattern of the plurality of 2-note patterns comprises a pitch differential and a duration ratio for two consecutive notes in at least one of the plurality of melodies, and (iii) at least one metric stored in association with the plurality of 2-note patterns. The system may also include a processor configured to execute the software instructions. The processor may be configured to read, from the database, frequency data for the plurality of 2-note patterns stored in the database. The processor may also be configured to determine, from the frequency data, a subset of the 2-note patterns, where each 2-note pattern in the subset appears in only one of the plurality of melodies stored in the database. The processor may further be configured to determine, based on the subset of 2-note patterns, a subset of the melodies stored in the database, where each melody in the subset is identified as having a unique 2-note pattern.

The disclosed embodiments include a method for analyzing melodies. The method may include receiving, by a processor, data for a musical composition, where the data includes a sequence of notes that make up a melody contained in the musical composition, and coding, by the processor, a pitch and a duration for at least one note in the sequence of notes. In addition, the method may include determining, based on the coding, at least one pitch differential and at least one duration ratio for at least two consecutive notes in the sequence of notes. The method may further include generating, by the processor, at least one metric associated with the melody based on at least one of the at least one pitch differential and the at least one duration ratio.

Consistent with other disclosed embodiments, a non-transitory computer-readable storage media may store program instructions, which are executed by a processor and perform any of the methods described herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments.

FIG. 7 is an exemplary diagram illustrating a coding of a melody, consistent with disclosed embodiments.

FIG. 8 is an exemplary diagram illustrating patterns in a melody, consistent with disclosed embodiments.

FIG. 11 is an exemplary diagram illustrating an analysis of melodies, consistent with disclosed embodiments.

FIG. 12 is another exemplary diagram illustrating an analysis of melodies, consistent with disclosed embodiments.

FIG. 14 is an exemplary diagram illustrating an analysis of patterns in melodies, consistent with disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
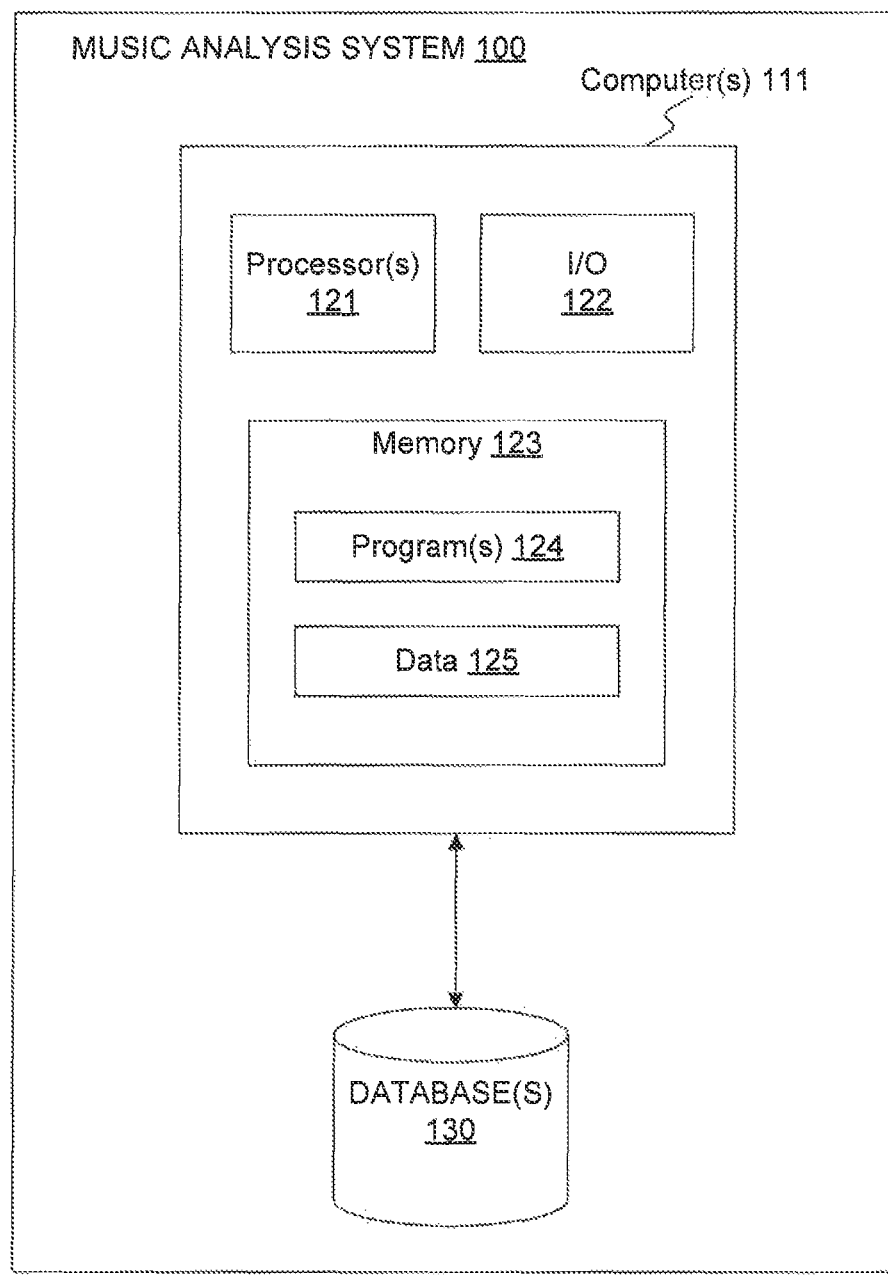
FIG. 1 is a block diagram of an exemplary music analysis system, consistent with disclosed embodiments.

FIG. 1 shows an exemplary system that may be associated with music analysis system 100. In one embodiment, the system may include one or more computers 111 having one or more processors 121, one or more memories 123, and one or more input/output (I/O) devices 122. Computer(s) 111 may take the form of a general purpose computer, a mainframe computer, or any combination of these components. In certain embodiments, computer(s) 111 (or a system including computer(s) 111) may be configured as a particular apparatus, system, and the like based on the storage, execution, and/or implementation of the software instructions that perform one or more operations consistent with the disclosed embodiments. Computer(s) 111 may be standalone, or it may be part of a subsystem, which may be part of a larger system.

Processor(s) 121 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in computer(s) 111.

Memory 123 may include one or more storage devices configured to store instructions used by processor(s) 121 to perform functions related to disclosed embodiments. For example, memory 123 may be configured with one or more software instructions, such as program(s) 124 that may perform one or more operations when executed by processor(s) 121. The disclosed embodiments are not limited to separate programs or computers configured to perform dedicated tasks. For example, memory 123 may include a single program 124 that performs the functions of the computer(s) 111, or program 124 may include multiple programs. Additionally, processor(s) 121 may execute one or more programs located remotely from computer(s) 111. For example, music analysis system 100, via computer(s) 111, may access one or more remote programs that, when executed, perform functions related to certain disclosed embodiments.

Memory 123 may also store data 125 that may reflect any type of information in any format that music analysis system 100 may use to perform music analysis functions. For example, data 125 may include musical composition data (e.g., composer, title, key signature) and data for a melody contained in the musical composition (e.g., pitches and durations for notes).

I/O devices 122 may be one or more devices configured to allow data to be received and/or transmitted by computer(s) 111. I/O devices 122 may include one or more digital and/or analog communication devices that allow computer(s) 111 to communicate with other machines and devices.

Computer(s) 111 may be connected to one or more database(s) 130. Computer(s) 111 may also be communicatively connected to database(s) 130. Database(s) 130 may include one or more memory devices that store information and are accessed and/or managed through server(s) (not shown). By way of example, database(s) 130 may include Oracle™ databases, Sybase™ databases, or other relational databases or non-relational databases, such as Hadoop sequence files, HBase, or Cassandra. The systems and methods of the disclosed embodiments, however, are not limited to separate databases. In one aspect, music analysis system 100 may include database(s) 130. Alternatively, one or more database(s) 130 may be located remotely from music analysis system 100. Database(s) 130 may include computing components (e.g., database management system, database server, etc.) configured to receive and process requests for data stored in memory devices of database(s) 130 and to provide data from database(s) 130.

Figure 2:
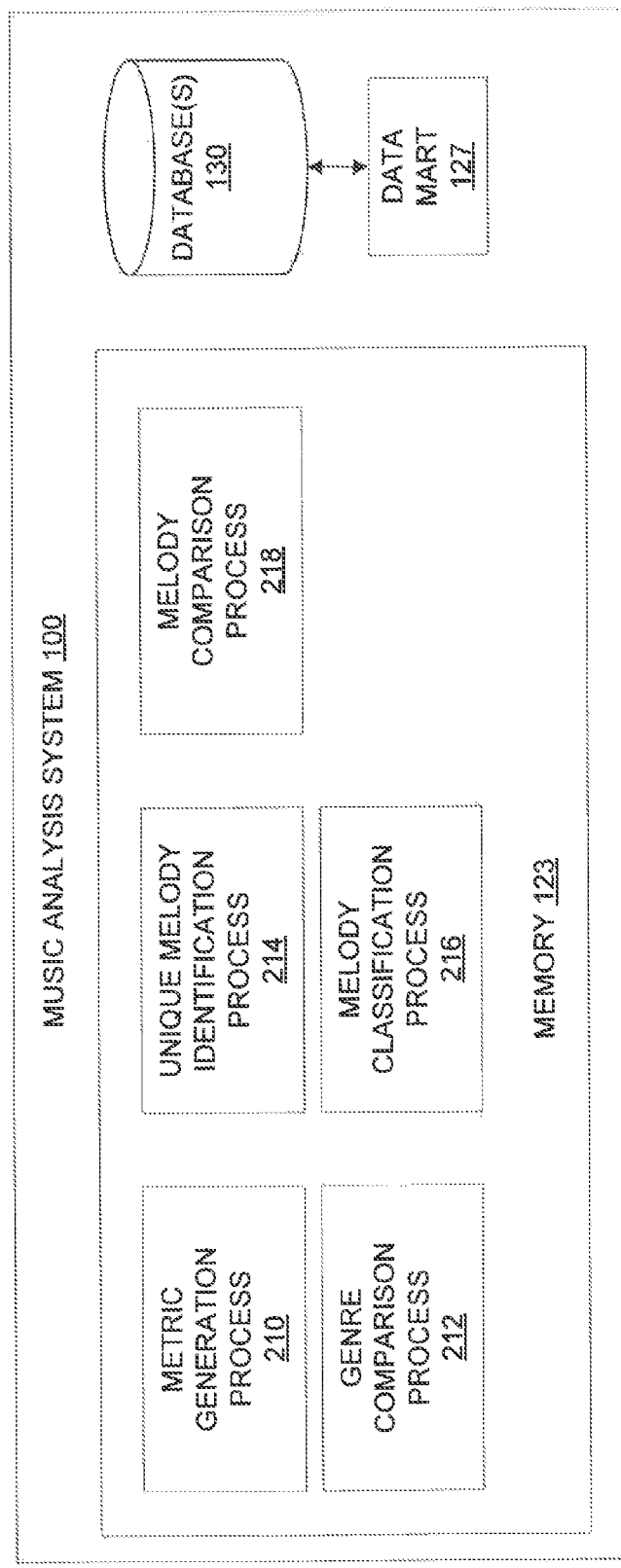
FIG. 2 is another block diagram of the exemplary music analysis system, consistent with disclosed embodiments.

As depicted in FIG. 2, in certain embodiments, music analysis system 100 may store software instructions that when executed by a processor(s) (e.g., processors(s) 121 of computer(s) 111), perform one or more operations consistent with the disclosed embodiments. In one embodiment, music analysis system 100 may store one or more processes in a memory, e.g., memory 123, that are executed by one or more processors (e.g., processors(s) 121 of computer(s) 111). In one example, memory 123 may include one or more of metric generation process 210, genre comparison process 212, unique melody identification process 214, process 216 for classifying a melody into one or more genres, and melody comparison process 218. The disclosed embodiments are not limited to these exemplary processes.

One or more of the processes shown in FIG. 2 may be implemented, retrieved from, or stored in another location, such as memory remote from music analysis system 100. Other types of processes may also be executed by music analysis system 100, consistent with the disclosed embodiments. Further, one or more processes 210-218 may be performed through a local software program or application provided to a user. Music analysis system 100 may also execute database management software, including for example, data mart or data warehouse type business software, to allow users to request certain operations, view data, and provide data to components of music analysis system 100. One or more of processes 210-218 may use data mart 127 and database(s) 130 to request, search, and retrieve data for performing operations associated with a particular process.

A melody may be understood as a sequence of notes with each note having a pitch and a duration. Pitches refer to the musical notes A, B, C, D, E, F, and G, and may include sharps and flats (e.g., A sharp or "A♯", flat or "B ♭"). Differences between notes may be characterized by, for example, differences in pitch, which may be referred to as "intervals." intervals may include half tones (e.g., the interval between an "A" and "A♯"), whole tones (e.g., the interval between an "A" and "B"), quarter tones, and the like. Duration refers to the length of a musical note, and may include quarter notes, half notes, dotted half notes, whole notes, eighth notes, sixteenth notes, thirty-second notes, and the like. Melodies may also include rests, which have a duration (e.g., quarter rest, half rest, whole rest, a rest for a specified number of measures, and so forth), but are not associated with a pitch. As used in this disclosure, a melody may refer to a melodic line of a musical composition. Musical compositions include music from any of a variety of genres, including classical, jazz, folk songs, pop music, and the like. In addition, the terms "melody," "tune," and similar terms, may be understood as having the same or similar meaning.

A processor, such as processor(s) 121, may process a melody and store the results in a database, such as database(s) 130. Such processing may include determining information relating to a melody, such as pitch and duration information of the notes that make up the melody. As an example, turning to FIG. 4 (sheet music for a melody of a song titled "Aura Lee"), processor(s) 121 may determine that the first note has a pitch of "D" above "middle C," and a duration of one beat (i.e., a quarter note). Similarly, processor(s) 121 may determine that the second note has a pitch of "G" above "middle C," and a duration of one beat. The pitch and duration information may be used to analyze melodies, as described below.

Figure 3:
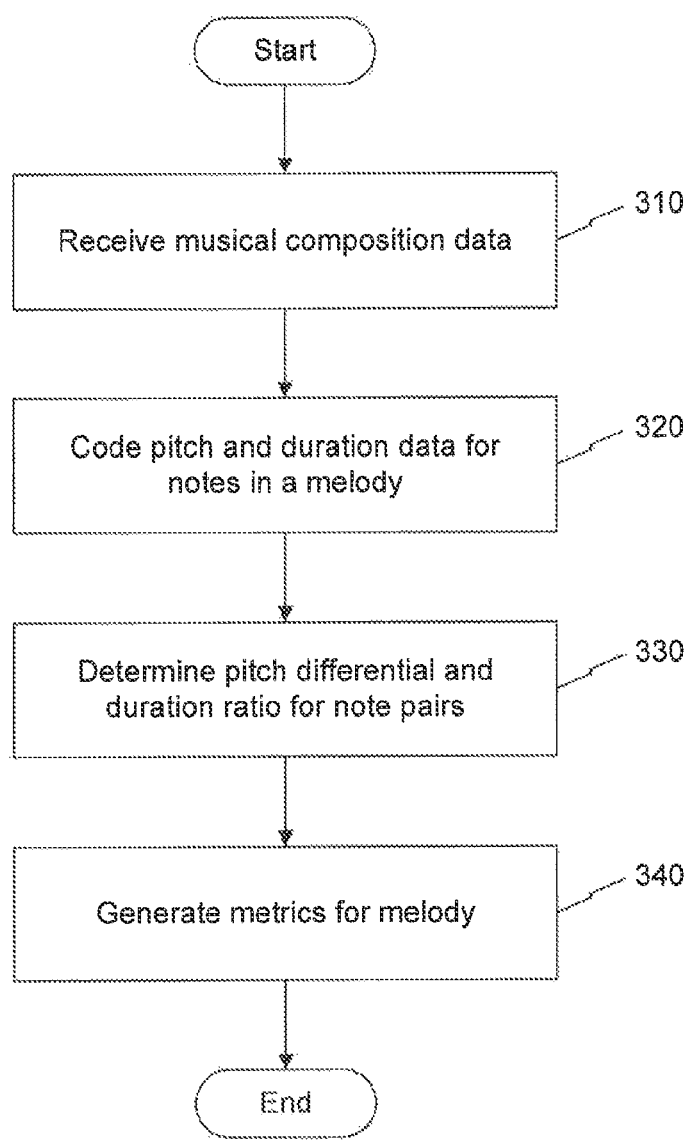
FIG. 3 is a flowchart of an exemplary process for generating metrics, consistent with disclosed embodiments.

FIG. 3 is a flowchart of process 210 for generating metrics for analyzing melodies, consistent with disclosed embodiments. At step 310, processor(s) 121 receives and/or determines data for a musical composition, which may include data for one or more melodies contained in the musical composition. For example, processor(s) 121 may extract data from one or more computer files, including locally-stored files and files transmitted over, or downloaded from, a network. Processor(s) 121 may also receive user-input data in a variety of formats. Such computer files and user-input data includes text files, documents, spreadsheets, media files (e.g., .wav, .mp3, .wma, .flac, and the like), digital sheet music files, and other formats. Thus, the data received for each melody, which may include information about musical notes in the melody (e.g., pitch and duration information, such as the pitch and duration information determined by processor(s) 121, as described above), may be in any digital or analog format. The disclosed embodiments are not limited to any particular data format.

Data received for the musical composition may include:

1.) A unique identification (ID) number associated with the musical composition. A unique ID number may be used to distinguish between musical compositions with the same properties, e.g., name and/or composer.

2.) Common name(s) or title of the musical composition;

3.) One or more key signatures of the musical composition;

4.) One or more time signatures of the musical composition;

5.) The year the musical composition was written and/or published;

6.) One or more genres of the musical composition;

7.) The composer of the musical composition; and

8.) The source of the musical composition, such as, for example, from where the melody information (e.g., pitch and duration information) was received. Processor(s) 121 may store the received data in database(s) 130 and, as will be described below, may use the stored information for analyzing melodies.

For purposes of this disclosure, each musical composition includes one melody. It is understood, however, that musical compositions may include multiple melodies. In such an embodiment, the data received for the musical composition may include different unique ID numbers associated with the different melodies so that each melody may be distinguished between other melodies in the same musical composition.

At step 320, processor(s) 121 may code the pitch and duration information for the notes that make up the melody, as described above. In some embodiments, processor(s) 121 may proceed directly to step 330, depending on the format in which the data is received at step 310. For example, if processor(s) 121 receives data coded in the MIDI ("Musical Instrument Digital Interface") coding scheme that includes the coded pitch and duration information for the notes that make up the melody, and the MIDI coding scheme is desired at step 320, processor(s) 121 may store the received data in database(s) 130 and proceed to step 330.

Figures 4, 5:
FIG. 4 is an exemplary diagram depicting a melody, consistent with disclosed embodiments.
FIG. 5 is an exemplary diagram illustrating a coding of a melody, consistent with disclosed embodiments.

Different schemes may be used to code the pitch and duration information; the disclosed embodiments are not limited to any particular scheme. For example, FIG. 5 illustrates an exemplary coding of the melody depicted in FIG. 4 using the publicly available LilyPond software. As shown in FIG. 5, the coding scheme reflects the title ("Aura Lee"), the key signature ("G Major"), and the time signature ("4/4") of the musical composition, as well as pitch and duration information for the notes that make up the melody of the musical composition. For instance, the first note is coded as "d4" (the note "D" with a duration of "4," for quarter note), the second note is coded as a "g" (the note "G") with a duration of "4" (note that the "4" is omitted because the prior note is coded with the same duration), the third note is coded as a "fis" ("F♯"; the "is" indicating a sharp) also with a duration of "4," and so forth.

In addition, processor(s) 121 may code the pitch and duration information using MIDI values. FIG. 7 illustrates examples of such a coding scheme. In these examples, numerical values indicate the notes that make up the three melodies represented in FIG. 7, which are depicted in sheet music form in FIG. 6. Referring to the first set of data at the top of FIG. 7, the MIDI coding scheme reflects a title of the musical composition ("Baa, Baa, Black Sheep"), a unique identification number ("0"), a key signature ("F"), the year the musical composition was written ("1761"), tag(s) describing the musical style ("Nursery"), the composer ("traditional," indicating that the composer is not known), the BPM or beats per minute ("110"), the time signature ("4/4"), and the source of the musical composition ("NA," indicating the source is not known). Thus, the musical composition and melody information reflected in this MIDI coding scheme includes similar information as described above in connection with step 310. Turning to the notes, FIG. 7 shows that the first two notes (at locations 1 and 2) are coded as having a pitch "65" (corresponding to the pitch "F") and a duration "4" (corresponding to a quarter note), the next two notes (at locations 3 and 4) are coded as having a pitch "72" (corresponding to the pitch "C") and a duration "4," and the next four notes (at locations 5-8) are coding as having a pitch "74" (corresponding to the pitch "D") and a duration "2" (corresponding to an eighth note). The location information is depicted below the respective notes in FIG. 6. In some embodiments, processor(s) 121 at step 320 may initially code pitch and duration information using a first coding scheme (e.g., LilyPond) and then re-code the pitch and duration information using a second coding scheme (e.g., MIDI).

Processor(s) 121 may continue the process at step 320 until it codes the pitch and duration information for each note in the melody. Processor(s) 121 may additionally store the pitch and duration information in database(s) 130 during, or after, the coding process.

Continuing to step 330, processor(s) 121 analyzes the pitch and duration information coded at step 320. For a given melody, processor(s) 121 may determine a difference in pitch (hereinafter denoted '$\Delta p$') and duration ratio (hereinafter denoted as 'r') for each consecutive pair of notes, where both pitches and durations are expressed using numerical values. Thus, the difference in pitch between a note $n_1$ having a pitch $p_1$ and a note $n_2$ (immediately following note $n_1$) having a pitch $p_2$ may be expressed as $\Delta p = p_2 - p_1$. Each pitch (e.g., $p_1$ and $p_2$) may be expressed as a numerical value, such as the MIDI value corresponding to the pitch. And the duration ratio between note $n_1$ having a duration $d_1$ and note $n_2$ having a duration $d_2$ may be expressed as $r = d_2/d_1$. Each duration (e.g., $d_1$ and $d_2$) may be assigned a numerical value such that, in some embodiments, a whole note may have a duration value of 16, a half note may have a duration value of 8, a quarter note may have a duration value of 4, an eighth note may have a duration value of 2, a sixteenth note may have a duration value of 1, a thirty-second note may have a duration value of 0.5, a sixty-fourth note may have a duration value of 0.25, a one-twenty-eighth note may have a duration value of 0.125, etc. Dotted notes may have a duration value of the corresponding non-dotted note multiplied by 1.5 and double-dotted notes may have a duration value of the corresponding non-dotted note multiplied by 1.75. For example, a dotted quarter note may have a duration value of 6 (4 1.5=6). The duration value of a dotted note may be determined using the formula $(2*j)-(j/2^k)$ where j is the duration value of the corresponding non-dotted note and k is the number of dots. For example, the duration value of the dotted quarter note may be determined to be 6 using this formula (where j is 4 for a quarter note and k is 1 for a note with one dot). After determining these values for difference in pitch and duration ratio, processor(s) 121 may store the pair ($\Delta p$, r) for each consecutive note pair using the location of the first note (of the pair) to uniquely identify the pair within a particular melody. For ease of explanation, a pair ($\Delta p$, r) is referred to as a "2-note pattern" throughout this disclosure.

Figure 6:
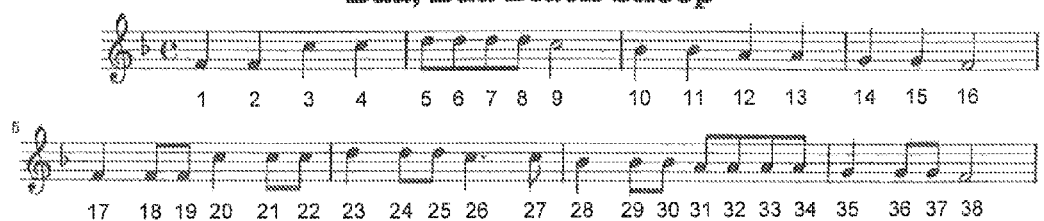
FIG. 6 is an exemplary diagram depicting melodies, consistent with disclosed embodiments.
Figure 6:
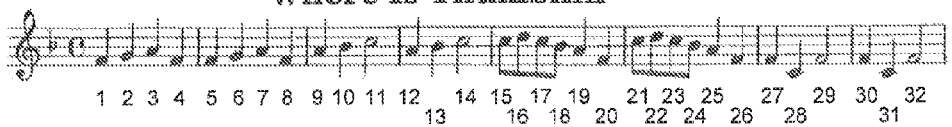
Figure 6:
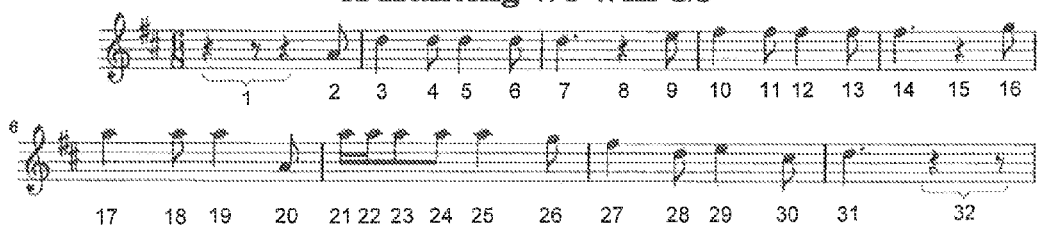

Thus, again referring to FIG. 7 as an example, the melody contained in the musical composition titled "Baa, Baa, Black Sheep" has a 2-note pattern (0, 1.0) at location 1 (i.e., the location of the first note of the melody). That is, $\Delta p=65-65=0$ (the first note and second note of the pattern both have a pitch "F" (MIDI value of 65), as shown in FIG. 6), and r=4/4=1 (both notes are quarter notes). Similarly, the melody has a 2-note pattern (7, 1.0) at location 2 (i.e., the location of the second note of the melody). In other words, $\Delta p=72-65=7$ (the first note of the pattern has a pitch "F" (MIDI value of 65) and the second note of the pattern has a pitch "C" (MIDI value of 72)), and r=4/4=1. And the melody has a 2-note pattern (2, 0.5) at location 4: $\Delta p=74-72=2$ (the first and second notes of the pattern having respective pitches "C" and "D" (having respective MIDI values of 72 and 74)), and r=2/4=0.5 (the first note and second note of the pattern being a quarter note and eighth note, respectively).

As illustrated in FIG. 8, processors) 121 may store in database(s) 130 the 2-note patterns ($\Delta p$, r), a unique identification number associated with the one or more musical compositions (or melodies) in which each 2-note pattern occurs, and the respective locations at which the 2-note patterns appear in the melodies. Database(s) 130 may be structured to store this information, and it may also store data for 3-note patterns, 4-note patterns, and n-note patterns, more generally, in association with the melodies in which the patterns appear. A 3-note pattern may be understood as two consecutive 2-note patterns, and may be represented by the 4-tuple ($\Delta p_1$, $r_1$, $\Delta p_2$, $r_2$), where $\Delta p_1$ refers to the difference in pitch between the first and second notes, $r_1$ refers to the duration ratio for the first and second notes, $\Delta p_2$ refers to the difference in pitch between the second and third notes, and $r_2$ refers to the duration ratio for the second and third notes. More generally, an n-note pattern may be understood as n−1 consecutive 2-note patterns, and may be represented by the k-tuple ($\Delta p_1$, $r_1$, $\Delta p_2$, $r_2$, ..., $\Delta p_{n-1}$, $r_{n-1}$), where k=(n−1)*2 and ($\Delta p_{n-1}$, $r_{n-1}$) refers to the difference in pitch and duration ratio between note n and note n−1. The disclosed embodiments contemplate different orderings of k-tuples and are not limited to any particular ordering; for example, the k-tuple may also be ordered as: ($\Delta p_1$, $\Delta p_2$, ... $\Delta p_{n-1}$, $r_1$, $r_2$, ..., $r_{n-1}$), where $\Delta p_i$ and $r_i$ refer to the difference in pitch and duration ratio between note i and note i+1 (0<i<n), respectively. Thus, database(s) 130 may also serve as an index or mapping between patterns and melodies containing the patterns.

FIG. 8 identifies the various 2-note patterns included in the melodies for the three musical compositions described in FIGS. 6 and 7. Thus, the 2-note pattern (0, 1.0) appears in each of the melodies described in FIG. 7 (represented as ID numbers "0," "1," and "2") at the locations indicated in the third column of FIG. 8. Similarly, FIG. 8 indicates that the 2-note pattern (7, 1.0) appears only in the melody associated with ID number "0" (in this case, "Baa, Baa, Black Sheep") at location "2" (i.e., the second note) in that melody.

As can be seen from FIG. 8, some 2-note patterns appear more frequently in a given melody than in other melodies, such as the 2-note pattern (0, 1.0), which appears at over ten locations in melody "0" ("Baa, Baa Black Sheep") but only twice in melodies "1" and "2" ("Where is Thumbkin?" and "A-Hunting We Will Go," respectively). The locations indicated in the third column of FIG. 8 indicate three sets of numbers corresponding to the locations of the 2-note pattern in the three melodies. The first set of numbers may correspond to the locations of the 2-note pattern in melody "0," the second set of numbers may correspond to the locations of the 2-note pattern in melody "1," and the third set of numbers may correspond to the locations of the 2-note pattern in melody "2." For example, the 2-note pattern is located at the $21^{st}$ and $23^{rd}$ notes of melody "2." Thus, the identified patterns may be located in the various melodies.

In addition, FIG. 8 demonstrates that some 2-note patterns appear in more melodies than other 2-note patterns. For example, the 2-note pattern (2, 2.0) appears in melodies "0," "1," and "2," whereas the 2-note pattern (−32, 1.0) appears only in melody "2." As will be described below, the frequency, the number of times a 2-note pattern occurs (e.g., within a melody, and across melodies), as well as other variables, may be used to determine metrics for analyzing melodies.

Figure 9:
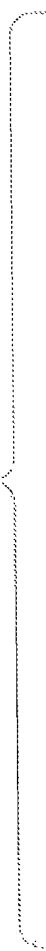
FIG. 9 is an exemplary diagram illustrating generated metrics, consistent with disclosed embodiments.

Returning to FIG. 3, processor(s) 121 at step 340 may generate one or more metrics that provide information about a given melody. Processor(s) 121 may store the metrics in database(s) 130 in association with the melody. In addition, processor(s) 121 may generate the metrics using the pitch differentials and duration ratios for 2-note patterns determined at step 330. Processor(s) 121 may also generate metrics based on other metrics or melody characteristics, such as: the number of notes in a melody, the number of 2-note patterns in a melody, the average $\Delta p$ for the 2-note patterns in a melody, the average r for the 2-note patterns in a melody, and so forth. Other examples of various metrics that processor(s) 121 may generate are shown in FIG. 9 and are further described below. FIG. 9 provides an example of data output from processor(s) 121, according to an exemplary embodiment. The data may include an identification number ("TuneID#") assigned to the melody (e.g., "0," as indicated in FIG. 9) and the determined metrics for the identified melody.

The metrics may be used for different applications, such as:

1.) Describing differences between musical genres (for example, process 212, which will be described in connection with reference to FIG. 10);

2.) Identifying the shortest pattern in a melody that makes it unique from other melodies (for example, process 214, which will be described in connection with reference to FIG. 13);

3.) Classifying a particular melody into one or more genres (for example, process 216, which will be described in connection with reference to FIG. 15); and 4.) Comparing melodies to determine similarities and differences between melodies (for example, process 218, which will be described in connection with reference to FIG. 16).

Exemplary Metrics

Processor(s) 121 may generate metrics, such as one or more of the following metrics identified in FIGS. 9, 11, and 12:

1. Number of notes ("#Notes"). This metric refers to the number of notes in a melody.

2. Number of patterns ("#Patt"). This metric refers to the number of 2-note patterns in a melody. In some embodiments, this metric may refer to the number of n-note patterns in a melody, where n is an integer greater than 2.

3. Number of patterns as a percentage of notes ("Patt%"). This metric refers to the number of 2-note patterns in a melody divided by the number of notes in that melody, expressed as a percentage.

4. Single-occurrence patterns ("#OncePatt"). This metric refers to the number of 2-note patterns occurring only once within a melody.

5. Variety of patterns within a melody as a percentage of notes ("PattPerNotes%"). This metric refers to the number of different 2-note patterns divided by the number of notes in a melody, expressed as a percentage. For instance, a melody with a PattPerNotes% of 20 percent indicates that one-fifth of the notes form two-pattern pairs that are different from each other, and the remaining 80 percent are duplicate 2-note patterns.

6. Single-occurrence patterns as a percentage of all patterns ("OncePatt%"). This metric refers to the number of 2-note patterns occurring only once within a melody, divided by the number of different 2-note patterns in that melody, and expressed as a percentage.

7. Single-occurrence patterns as a percentage of notes) ("OncePatt%Notes"). This metric refers to the number of 2-note patterns occurring only once within a melody divided by the number of notes in that melody, expressed as a percentage.

8. Rests per note ("#Rests%Note" or "Av#Rests%Note"). This metric refers to the number of rests divided by the number of notes within a melody, expressed as a percentage. The coding scheme used to code pitch and duration information at step 320 of process 210 may assign a unique value to rests. For example, in the MIDI coding scheme as illustrated in FIG. 7, rests are coded as having a pitch of "0" and a duration indicating the length of the rest.

9. Absolute pitch change ("NonAural" or "AvNonAural"). This metric refers to the average intervals between each pair of notes. As discussed above, an interval refers to the distance or difference in pitch between two notes. The interval may be based on the 12-tone scale, so that the interval between a "C#" and a "D" is one. This metric includes rests. The interval between a note with a given pitch (such as "C#") and a rest may be equal to the pitch itself or may be coded as a specific unique number to flag the occurrence of a rest.

10. Relative pitch change ("Aural" or "AvAural"). This metric refers to the average intervals between each pair of notes, but does not include the effect of rests. For instance, if a "C" is followed by a rest which is followed by a "D," the "C"-rest-"D" combination may be coded as a two, i.e., the interval between "C" and "D."

11. Use of common patterns ("%Freq" or "Av%Freq"). This metric refers to the weighted mean of the overall frequency of each 2-note pattern in a melody. "Overall frequency" refers to the number of times that a particular 2-note pattern appears in database(s) 130, expressed as a percentage of the total number of times that all 2-note patterns appear in all melodies in database(s) 130. For example, if 2-note pattern X appears 50 times in database(s) 130, and all 2-note patterns (including pattern X) appear a total of 500 times in database(s) 130, then pattern X may have an overall frequency equal to 0.10 (50 divided by 500). Processor(s) 121 may determine the weighted mean of the overall frequencies of 2-note patterns in the melody by first multiplying the overall frequency of each particular 2-note pattern by the number of times that pattern appears in the melody, computing the sum of these values, and then dividing by the sum of the overall frequencies of the 2-note patterns in the melody to arrive at the weighted mean. In an exemplary embodiment, melody A may include pattern X and pattern Y. If pattern X has an overall frequency of 0.10 and appears 30 times in melody A and pattern Y has an overall frequency of 0.01 and appears 20 times in melody A, then processor(s) 121 may compute the weighted mean as the sum of the product of the overall frequency of the respective patterns times the number of times the respective patterns appear in melody A, divided by the sum of the overall frequencies for the patterns in melody A ([(0.10*30)+(0.01*20)]/[0.10+0.01]=29.1). Thus, this metric represents a degree to which a given melody has relatively common or uncommon 2-note patterns.

12. Unique patterns ("#Uq" or "Av#Uq"). This metric refers to the number of 2-note patterns in a given melody that have a frequency (the number of times the 2-note pattern appears in database(s) 130) of one; that is, which are unique (do not appear in any other melody in database(s) 130). Thus, this metric represents a degree to which a composer uses relatively rare patterns to form the melody.

13. Unique patterns as percent ("%Uq" or "Av%Uq"). This metric refers to the number of unique 2-note patterns in a given melody divided by the number of different 2-note patterns in the melody.

14. Range of pitches ("Range" or "RangeAv"). This metric refers to the difference in pitch between the note(s) with the lowest pitch and the note(s) with the highest pitch (known as the range) in a given melody.

15. Note duration ("AvgDurR" or "DurRAv"). This metric refers to the average length or duration of each note in a given melody, calculated as a duration ratio r (discussed above) for each 2-note pattern. For a given 2-note pattern, the duration ratio is the duration of the second note divided by the duration of the first note. This metric determines the average duration ratio in the melody.

16. Runs per note ("#Runs/Note" or "Av#Runs/Note"). A run may be defined as a succession of notes going in one direction in pitch, i.e., either ascending in pitch (going "up") or descending in pitch (going "down"). This metric refers to the number of runs in a given melody divided by the number of notes in the melody.

17. Average run length ("AvRunLen"). The length of a run refers to the number of notes included in the run. This metric refers to the average run length for the runs in a given melody.

18. Maximum run length ("MaxRunLen"). This metric refers to the longest run length for the runs in a given melody.

19. Repetitive note durations ("Dur1%" or "AvDur1%"). This metric refers to the number of times that two consecutive notes have the same length or duration (e.g., a quarter note, followed by a quarter note of any pitch), expressed as a percentage of the notes in a given melody.

20. Repetitive note pitches ("Pit0%" or "AvPit0%"). This metric refers to the number of times that two consecutive notes have the same pitch (e.g., a "C", followed by a "C" of any length or duration), expressed as a percentage of the notes in a given melody.

21. Variety of 2-note patterns, weighted ("FreqSD" or "AvNoFrqSD"). This metric refers to the standard deviation of the frequency distribution of the 2-note patterns in a particular melody, expressed as a percentage of the sum of frequencies of 2-note patterns appearing in all melodies in database(s) 130. Processor(s) 121 may first determine the square of the difference between each pattern's frequency and the weighted mean of the frequencies in that melody. Processor(s) 121 may then compute the sum of the squared values and divide by N or N−1, as appropriate (e.g., depending on the standard deviation formula used), where N refers to the number of melodies in database(s) 130. Processor(s) 121 may then determine the standard deviation of the frequencies by taking the square root of that result. Thus, this metric may provide a measure of whether the melody tends to use a wide variety of common and uncommon 2-note patterns versus a small variety.

22. Variety of 2-note patterns, unweighted ("Patt2SD" or "AvTuFrqSD") This metric also refers to the standard deviation of the frequency distribution of the 2-note patterns in a particular melody, expressed as a percentage of the sum of frequencies of 2-note patterns appearing in all melodies in database(s) 130. In this metric, processor(s) 121 may first determine the square of the difference between each pattern's frequency and the simple mean (unweighted) of the frequencies for that melody. Processor(s) 121 may then compute the sum of those squared values and divide by N or N−1, as appropriate (e.g., depending on the standard deviation formula used), where N refers to the number of melodies in database(s) 130. Processor(s) 121 may then determine the standard deviation by taking the square root of the result. Duplicate 2-note patterns within a melody may not be included in the determination of the mean. Thus, this metric may provide another measure of whether the melody tends to use a wide variety of common and uncommon 2-note patterns versus a small variety.

23. Pick-up duration ("PU" or "AvPU"). This metric refers to the length or duration of any pick-up notes in a given melody. Pick-up notes may be understood as one or more notes preceding the start of a melody, and may be unstressed or unaccented relative to the notes that they precede. For example, processor(s) 121 may determine the note(s) preceding one or more rests that appear at the beginning of a melody to be pick-up notes. The length of the pick-up notes may be measured using the MIDI convention (i.e., a quarter note is assigned a duration of "4," half note is assigned a duration of "8," and so forth).

24. Pick-up percent ("PU%" or "AvPU%"). This metric refers to the length or duration of any pick-up notes in a given melody, divided by the length of the first measure of the melody. Processor(s) 121 may determine the length of the first measure of the melody based on the time signature. This metric may take into account the time signature of the melody.

25. Going to rests ("ToRestR" or "AvToRestR"). This metric determines the number of instances where a note is followed by a rest, as measured by the ratio of the duration of the rest divided by the duration of the preceding note. For purposes of this metric, consecutive rests may be counted as a single rest.

26. Coming from rests ("FmRestR" or "AvFmRestR"). This metric determines the number of instances where a rest is followed by a note, as measured by the ratio of the duration of the note divided by the duration of the preceding rest. For purposes of this metric, consecutive rests may be counted as a single rest.

27. Number of different pitches ("pCtAv"). This metric refers to the number of different pitches appearing in a given melody. The number of different pitches may be determined by counting the quantity of unique MIDI numbers in the melody corresponding to pitches, excluding rests. For example, if the melody includes only the pitches "C" "F," "G," "A," and "B," corresponding to the MIDI numbers 60, 65, 67, 69, and 71, respectively, this metric may determine the number of different pitches to be five.

28. Number of unique pitch differentials ("dPCtAv"). This metric counts the number of unique pitch differentials of one note, followed by another note, used to construct a given melody. In other words, this metric may indicate the number of unique Δp values in the melody. For example, this metric may count the interval between the notes "C" and "D" (MIDI values 60 and 62, respectively) and the interval between the notes "D" and "E" (MIDI values 62 and 64, respectively) only once, because while the notes are different, the intervals between the respective note pairs are the same (as are the Δp values). However, the metric may count both intervals between the note pairs "C" and "D" (MIDI values 60 and 62, respectively) and "D" and "C" (MIDI values 62 and 60, respectively). This is because while the magnitude of the intervals is the same, the first interval (corresponding to "C" and "D") is positive and increasing in pitch, whereas the second interval is negative and decreasing in pitch. Thus, this metric captures the variety of different intervals appearing in the melody.

29. Number of different durations ("durCtAv"). This metric counts the number of different lengths or durations of individual notes (tied notes may be considered to have a duration equal to the sum of the duration of each individual note) used to construct a given melody. For example, an Irish jig may be made up entirely of eighth notes; for such a piece, this metric may provide a count of "one."

30. Number of different duration ratios ("durRCtAv"). This metric identifies the number of different r values in a given melody, where r refers to the ratio of the duration of a second note (of a 2-note pattern) divided by the duration of a first note. For example, this metric may provide a count of two for a melody with no rests made up of alternating quarter notes and half notes.

31. Normalized number of different pitches ("pCt/NAv"). This metric identifies the number of different pitches appearing in a given melody (see metric no. 27, described above) divided by the number of notes in the melody, expressed as a percentage.

32. Normalized number of unique pitch differentials ("dPCt/NAv"). This metric identifies the number of unique pitch differentials of one note, followed by another note, used to construct a given melody (see metric no. 28, described above) divided by the number of notes in the melody, expressed as a percentage.

33. Normalized number of durations ("durCt/NAv"). This metric identifies the number of different lengths or durations of individual notes used to construct a given melody (see metric no. 29, described above) divided by the number of notes in the melody, expressed as a percentage.

34. Normalized number of duration ratios ("durRCt/NAv"). This metric identifies the number of different r values in a given melody (see metric no. 30, described above) divided by the number of notes in the melody, expressed as a percentage.

As illustrated by exemplary metric nos. 31-34, the various metrics described above may be normalized. For example, processor(s) 121 may normalize one or more metrics for use in the disclosed embodiments, such as process 212, which will be described in connection with FIG. 10, below. Normalizing a metric may include dividing the value of a metric by:
  (i) the number of notes in a melody;
  (ii) the number of n-note patterns in a melody;
  (iii) the number of measures in a melody;
  (iv) the number of beats in a melody (e.g., the sum of the note and rest durations in the melody);
  (v) the number of n-note patterns in database(s) 130;
  (vi) the sum of frequencies of n-note patterns appearing in all melodies in database(s) 130;
  (vii) the number of melodies in database(s) 130; and so forth.

Additionally, the disclosed embodiments may include different applications using the various metrics described above. For example, the metrics may be used to generate melodies that are based on different note patterns (e.g., note patterns satisfying one or more of the various metrics), feature certain combinations of pitches and durations, and/or fall under a particular musical genre or classification. For example, the system may serve as an automatic custom tune generator that may be configured to automatically generate a musical composition that includes note patterns considered to be more likely to be liked by the public (e.g., the note pattern(s) having the highest frequency of use). The generator may also be configured to receive input from a user, such as a choice of musical genre or other style (e.g., love song, classical, jazz, etc.), in order to generate the musical composition according to the user's preferences. The metrics may also be used to compare the similarities and differences between musical genres, musical compositions, melodies, note patterns, and the like. For example, the system may be used to determine and quantify how close two melodies from two musical compositions are to each other, e.g., to determine the likelihood of copyright infringement. The system may determine how many note patterns from a first melody are included in a second melody (optionally, the number of identical note patterns may be divided by the total number of note patterns in the first melody).

Figure 10:
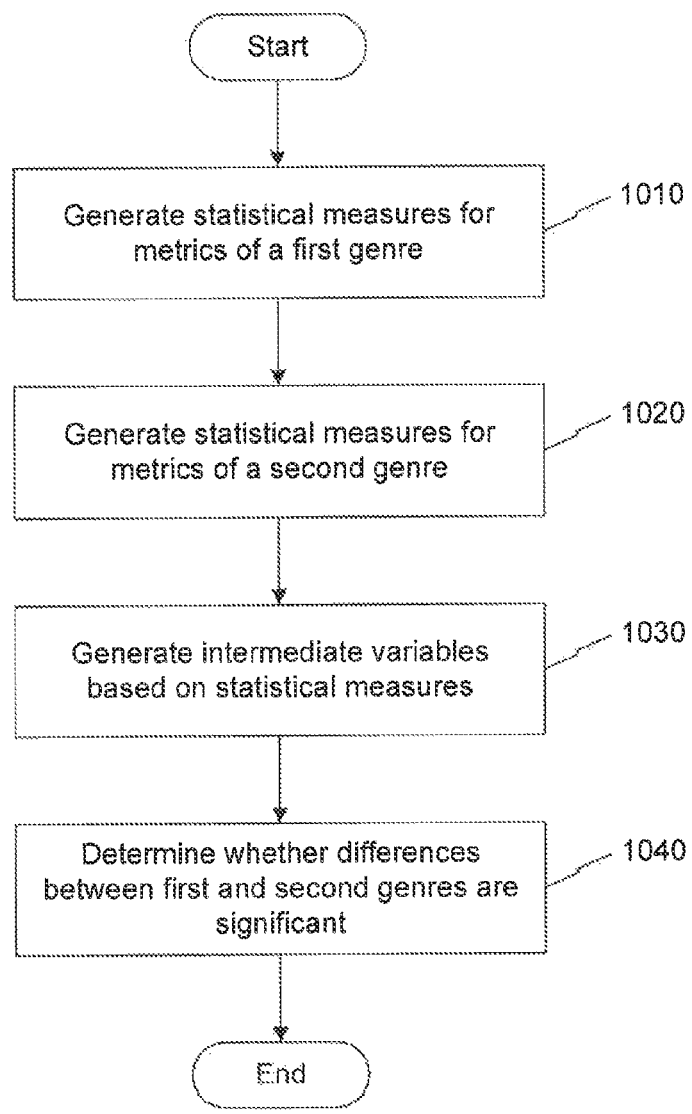
FIG. 10 is a flowchart of an exemplary process for comparing genres, consistent with disclosed embodiments.

FIG. 10 illustrates process 212 for comparing musical genres. For example, process 212 may be used to determine similarities and differences between genres at least based on comparing metrics. At step 1010, processor(s) 121 may generate statistical measures corresponding to various metrics (as described above) for a first musical genre. For instance, processor(s) 121 may generate the mean and standard deviation ("SD") for various metrics (e.g., "PattPerNotes%," "OncePatt%," "OncePatt%Notes") as depicted in the example for the musical genre "Irish" provided in FIG. 11. The mean of a metric, denoted as $\bar{x}$, represents the average value for the metric for melodies in a given musical genre. For instance, processor(s) 121 may calculate the mean using Equation (1) below:

$$\bar{x} = \frac{1}{N} \sum_{i=1}^{N} x_i \tag{1}$$

where the summation represents the sum of the numerical values corresponding to the metric for the melodies in the genre, and N represents the number of melodies in the genre.

The standard deviation of a metric, denoted as s, represents the average variation from the mean value of the metric for melodies in a given musical genre. For instance, processor(s) 121 may calculate the standard deviation using Equation (2) below:

$$s = \sqrt{\frac{1}{N-1} \sum_{i=1}^{N} (x_i - \bar{x})^2} \tag{2}$$

where N represents the number of melodies in the genre, $x_i$ represents the value of the metric for an individual melody (i.e., the "ith" melody, where i ranges from 1 to N), and $\bar{x}$ represents the mean of the metric for the musical genre. Processor(s) 121 may use different formulas for calculating the mean and standard deviation other than those described above; the disclosed embodiments are not limited to any particular formulas. Processor(s) 121 may use other statistical descriptors and their formulas based on the underlying distribution of the musical data. At step 1020, processor(s) 121 may generate the same statistical measures for a second musical genre (e.g., "English," as shown in FIG. 11).

Proceeding to step 1030, processor(s) 121 may generate intermediate variables using the statistical measures generated at steps 1010 and 1020, described above. For each metric for which one or more statistical measures were generated at steps 1010 and 1020, processor(s) 121 may determine:

1.) The difference in means, denoted as $\Delta\bar{x}$, for the metric, using Equation (3) below:

$$\Delta\bar{x} = \bar{x}_1 - \bar{x}_2 \tag{3}$$

where $\bar{x}_1$ refers to the mean of the metric for the first musical genre, and $\bar{x}_2$ refers to the mean of the metric for the second musical genre.

2.) The standard error, denoted as SE, for the metric. SE may be calculated using Equation (4) below:

$$SE = s/\sqrt{N} \tag{4}$$

where s refers to the standard deviation associated with the metric for the melodies in the genre and N refers to the number of melodies in the genre.

3.) The degrees of freedom, denoted as df, for the metric. df may be calculated using Equation (5) below:

$$df = \frac{\left(\frac{s_1^2}{n_1} + \frac{s_2^2}{n_2}\right)^2}{\frac{1}{n_1-1}\left(\frac{s_1^2}{n_1}\right)^2 + \frac{1}{n_2-1}\left(\frac{s_2^2}{n_2}\right)^2} \tag{5}$$

where $n_1$ and $n_2$ refer to the number of melodies in a given first and second musical genre, and $s_1$ and $s_2$ refer to the standard deviations of a metric for melodies in the first and second musical genre.

Thus, using the additional statistical measures generated at step 1030, processor(s) 121 may determine at step 1040 whether the differences between the first and second musical genres are significant. In some embodiments, processor(s) 121 may, for each metric, examine the difference in means between the first and second musical genres ($\Delta\bar{x}$) and determine whether the difference is significant. Put another way, processor(s) 121 may determine the probability that the means for the first and second musical genres for a given metric are significantly different at a given confidence level, such as the 90%, 95%, or 99% confidence levels. Additional statistical tools may be used to make this determination. For example, in some embodiments, processor(s) 121 may first calculate the t-statistic, denoted as t. The t-statistic may be calculated using Equation (6) below:

$$t = \frac{\bar{x}_1 \cdot \bar{x}_2}{\sqrt{(s_1^2/n_1 + s_2^2/n_2)}} \tag{6}$$

where $n_1$ and $n_2$ refer to the number of melodies in a given first and second musical genre, $\bar{x}_1$ and $\bar{x}_2$ refer to the means of the metric for the first and second musical genre, and $s_1$ and $s_2$ refer to the standard deviations of a metric for melodies in the first and second musical genre.

After calculating the t-statistic, processor(s) 121 may compare t with the critical t-statistic, denoted as t*, where t* may be obtained from publicly available statistical distribution tables. Statistical distribution tables may provide numerical values for t* based on a number of factors, including sample size, desired confidence level, and other variables. If the t-statistic is greater in value than the critical t-statistic (i.e., if t>t*), processor(s) 121 may determine that the means between the first and second musical genres are significantly different at the chosen confidence level. Alternatively, statistical methods, tests, and formulas other than the t-statistic test may be used to determine whether the differences between the first and second musical genres are significant.

FIGS. 11 and 12 provide examples of comparisons between musical genres. FIG. 11 provides an example of a comparison between certain melodies from the Irish and English musical genres. The first column of the table in FIG. 11 lists different metrics for analyzing the differences between melodies in different genres. These metrics are described above in the "Exemplary Metrics" section. The second and third columns correspond to first and second musical genres "Irish" and "English," respectively. As indicated in the respective column headings, the numerical values in these columns indicate the "Mean," "n" (sample size), and "SD" (standard deviation). Thus, the genre "Irish" has a mean of 34.3 and SD of 14.04 for the metric "PattPerNotes%," across a sample size of 19 melodies. For the same metric, the genre "English" has a mean of 37.2 and SD of 12.89 across a sample size of 29 melodies. Processor(s) 121 determined these means and standard deviations based on the description provided in connection with steps 1010 and 1020, described above.

Referring back to the table in FIG. 11, the fourth, fifth, and sixth columns indicate the "Means Diff" (difference in means), "SE" (standard error), and "DF" (degrees of freedom), respectively, associated with a given metric for the two genres. Thus, the difference in means for the "PattPerNotes%" metric is 34.3 (Irish mean)−37.2 (English mean)=−2.94. This value may be understood as showing that melodies classified in the English musical genre (English melodies) have, on average, 2.94 percentage points greater number of different 2-note patterns in a melody compared to their Irish counterparts.

Continuing on to the fifth and sixth columns, the standard error and degrees of freedom for the "PattPerNotes%" metric are 4.01 and 36, respectively. Processor(s) 121 determined these values based on the description provided in connection with step 1030, described above. Processor(s) 121 may use the standard error and degrees of freedom to determine the values for "t" (t-statistic) and "t*" (critical t-statistic) indicated in the seventh and eighth columns of FIG. 11, respectively. Processor(s) 121 may compare the t and t* values in these columns to arrive at the determinations in the ninth column. As described in connection with step 1040, described above, a difference in means for a given metric is significant if t>t*. As shown in the ninth column, none of the differences in means were determined to be significant (i.e., t*>t for each metric in this example). In contrast, referring to the table in FIG. 12, which provides another example of a comparison between certain melodies from the American and Irish musical genres, the differences in means for four metrics were determined to be significant: "AvNonAural," "maxRunLenAv," "Av#Rests%Note," and "AvFmRestR." That is, for each of these metrics, the inequality t>t* is true.

Figure 13:
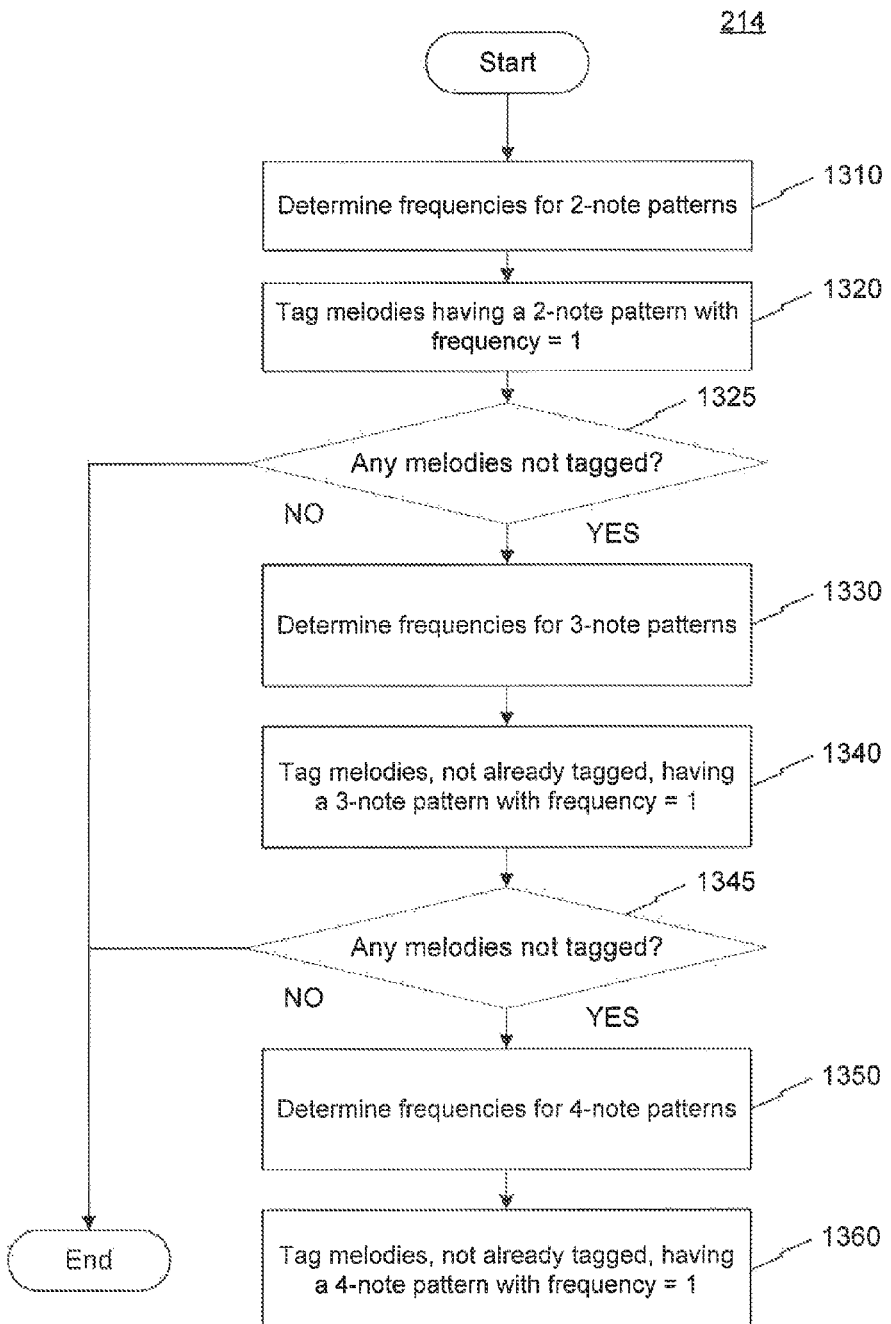
FIG. 13 is a flowchart of an exemplary process for identifying unique melodies, consistent with disclosed embodiments.

FIG. 13 illustrates process 214 for identifying the shortest pattern in at least one melody that makes the melody unique from other melodies. In doing so, process 214 may determine the frequencies of note patterns stored in database(s) 130, identify those patterns occurring in only one melody in database(s) 130, and tag such patterns to indicate that they occur in only one melody and are unique. Process 214 may also tag those melodies to indicate that they contain a unique note pattern. The tagging of note patterns and melodies may be updated as additional note patterns and melodies are stored in database(s) 130. Thus, process 214 may identify, for at least one melody, the shortest pattern that appears only in that melody and in no other melody in database(s) 130.

Processor(s) 121 may determine which melodies stored in database(s) 130 contain a unique 2-note pattern. At step 1310, processor(s) 121 determines the frequencies for 2-note patterns contained in melodies stored in database(s) 130. Processor(s) 121 may load frequency data (e.g., the number of occurrences) for each 2-note pattern stored in database(s) 130 and identify those 2-note patterns having a frequency of one. A 2-note pattern having a frequency of one may indicate that the pattern is found in only one melody in database(s) 130.

At step 1320, processor(s) 121 may tag those melodies containing a 2-note pattern with a frequency of one in database(s) 130 to indicate that they are unique. As previously described, data stored for 2-note patterns in database(s) 130 is stored in association with the melody in which the 2-note pattern occurs.

At step 1325, processor(s) 121 determines whether any melodies in database(s) 130 have not been tagged. In other words, processor(s) 121 determines whether one or ore melodies in database(s) 130 has not been identified as containing a unique 2-note pattern (i.e., with a frequency of one). If so, at step 1325 ("YES"), one or more melodies do not contain a unique 2-note pattern, and processor(s) 121 proceeds to step 1330. Otherwise, at step 1325 ("NO"), processor(s) 121 determines that all melodies contain a unique 2-note pattern and process 214 concludes. Irrespective of which branch processor(s) 121 takes at step 1325, for each melody tagged at step 1320, it may be understood that the shortest pattern uniquely identifying the melody is a 2-note pattern.

For the melodies that do not have a unique 2-note pattern, processor(s) 121 may determine whether the melodies contain a unique 3-note pattern. At step 1330, processor(s) 121 determines the frequencies for 3-note patterns contained in melodies stored in database(s) 130. A 3-note pattern may be represented by the 4-tuple $(\Delta p_1, r_1, \Delta p_2, r_2)$, where $\Delta p_1$ refers to the difference in pitch between the first and second notes, $r_1$ refers to the duration ratio for the first and second notes, $\Delta p_2$ refers to the difference in pitch between the second and third notes, and $r_2$ refers to the duration ratio for the second and third notes. Processor(s) 121 may code 3-note patterns using process 210, described above, and store the coded data in database(s) 130 in association with the respective melodies in which the 3-note patterns occur. And similar to step 1310, processor(s) 121 at step 1330 may load frequency data for each 3-note pattern stored in database(s) 130 and identify those 3-note patterns having a frequency of one.

At step 1340, processor(s) 121 may tag those melodies containing a 3-note pattern with a frequency of one in database(s) 130 to indicate that they are unique. Processor(s) 121 may tag only those melodies that were not previously tagged, i.e., those melodies that do not contain a unique 2-note pattern. In other words, if processor(s) 121 determines that a particular melody has a unique 3-note pattern, but that the melody was also previously tagged or identified as having a unique 2-note pattern (see step 1320), then processor(s) 121 may not tag the melody as having a unique 3-note pattern. Thus, for each melody tagged at step 1340, it may be understood that the shortest pattern uniquely identifying the melody is a 3-note pattern.

At step 1345, processor(s) 121 determines whether any melodies in database(s) 130 have not been tagged. In other words, processor(s) 121 determines whether one or more melodies in database(s) 130 has not been identified as containing a unique 2-note pattern or a unique 3-note pattern. If so, at step 1345 ("YES"), processor(s) 121 determines that one or more melodies do not contain either a unique 2-note or 3-note pattern, and proceeds to step 1350. Otherwise, at step 1345 ("NO"), all melodies contain either a unique 2-note or 3-note pattern and process 214 concludes.

For those melodies which do not contain either a unique 2-note or 3-note pattern, processor(s) 121 determines whether the melodies have a unique 4-note pattern at steps 1350 and 1360. Steps 1350 and 1360 may be similar to steps 1330 and 1340, described above. A 4-note pattern may be represented by the 6-tuple ($\Delta p_1$, $r_1$, $\Delta p_2$, $r_2$, $\Delta p_3$, $r_3$), where ($\Delta p_1$, $r_1$, $\Delta p_2$, $r_2$) are as described above in connection with step 1330, and ($\Delta p_3$, $r_3$) refers to the difference in pitch and duration ratio between the third and fourth notes. Processor(s) 121 may code 4-note patterns using process 210, described above, and store the coded data in database(s) 130 in association with the respective melodies in which the 4-note patterns occur. And similar to steps 1310 and 1330, processor(s) 121 at step 1350 may load frequency data for each 4-note pattern stored in database(s) 130 and identify those 4-note patterns having a frequency of one. Processor(s) 121 may also tag the 4-note patterns having a frequency of one in database(s) 130 to indicate that they are unique. At step 1360, processor(s) 121 may tag those melodies (that were not previously tagged) containing a 4-note pattern with a frequency of one. Thus, for each melody tagged at step 1360, it may be understood that the shortest pattern uniquely identifying the melody is a 4-note pattern.

In general, process 214 may be applied to any length patterns, which may be denoted as n-note patterns. An n-note pattern may be represented by the k-tuple ($\Delta p_1$, $r_1$, $\Delta p_2$, $r_2$, ..., $\Delta p_{n-1}$, $r_{n-1}$), where k=(n−1)*2 and ($\Delta p_{n-1}$, $r_{n-1}$) refers to the difference in pitch and duration ratio between note n and note n−1. In some embodiments, process 214 concludes when, for each melody stored in database(s) 130, the shortest pattern uniquely identifying the melody has been determined. While some melodies may be uniquely identified by 2-note or 3-note patterns, the shortest patterns that uniquely identify other melodies may be 5-note or 6-note patterns (or longer). It may be understood that as the number of melodies stored in database(s) 130 increases, the proportion of melodies that are uniquely identified by shorter patterns (i.e., 2-note or 3-note patterns) may decrease.

As described above, an n-note pattern may be considered unique if it has a frequency of one. Alternatively, an n-note pattern may be considered unique if it occurs in only one melody regardless of its frequency. For example, FIG. 14 provides an example of data output from processor(s) 121 indicating the uniqueness of the 2-note patterns identified in three melodies, according to an exemplary embodiment. The first column of the table of FIG. 14 identifies the 2-note patterns in the three melodies. The second column indicates the frequency or the number of times the 2-note pattern occurs in the three melodies. For example, the first 2-note pattern (0, 1.000) occurs 20 times in the three melodies. The third and fourth columns indicate the number and percentage of the melodies in which the 2-note pattern occurs. For example, the first 2-note pattern (0, 1.000) occurs in all three melodies, which corresponds to 100% of the melodies. For the 2-note patterns that are unique (that occur in only one melody), the fifth column indicates the melody and the location within the melody where the 2-note pattern occurs. For example, the 2-note pattern (7, 1.000) is unique to melody "0" ("Tune 0") and is located at the second note (location 2 or "loc [2]") of melody "0". The fifth column of the table may also indicate other unique patterns that may have a frequency of more than one. For example, the 2-note pattern (−2, 4.000) is unique to melody "0" ("Tune 0") and occurs twice (frequency of 2) in that melody. The table of FIG. 14 identifies 25 unique 2-note patterns in the three melodies, and melody "2" ("Tune 2") includes 10 unique 2-note patterns.

Figure 15:
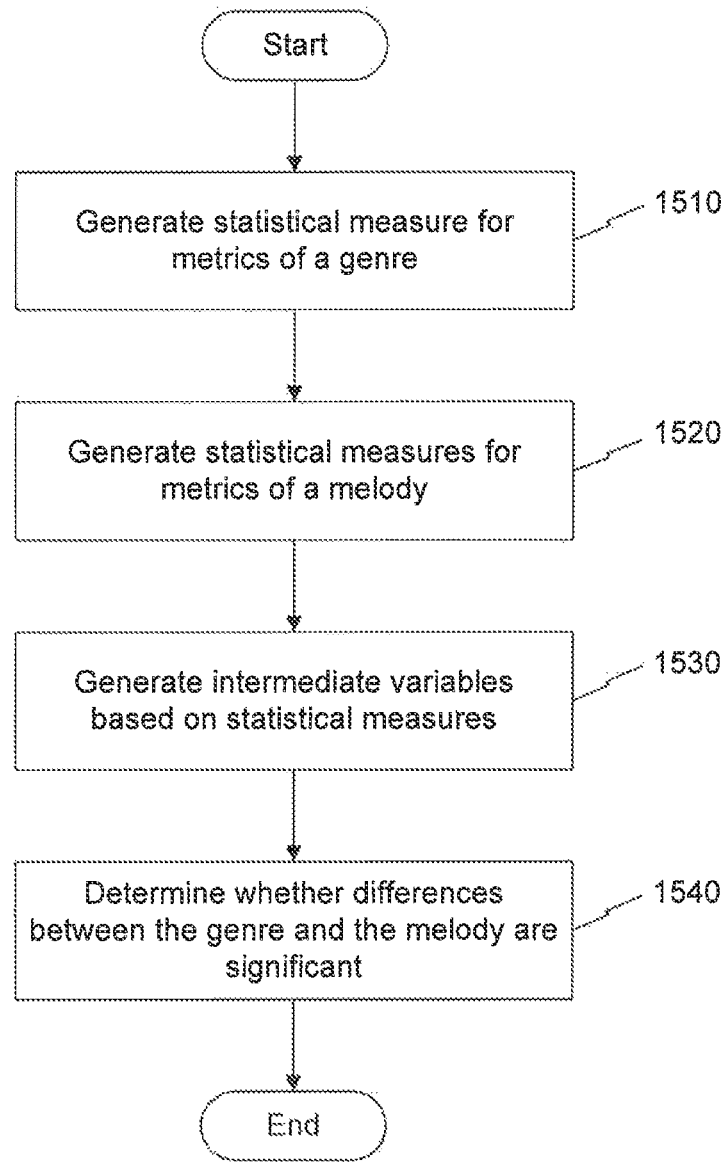
FIG. 15 is a flowchart of an exemplary process for classifying a melody into one or more genres, consistent with disclosed embodiments.

FIG. 15 illustrates a process 216 for classifying a specific melody into a particular genre. Thus, processor(s) 121 may identify a particular melody and a particular genre, and may determine whether the melody may be classified in the genre.

At step 1510, which is similar to step 1010, processor(s) 121 may generate statistical measures corresponding to various metrics (as described above) for the musical genre. For instance, the mean of a metric for the melodies in the musical genre may be calculated using Equation (1), as described above. At step 1520, processor(s) 121 may generate the same statistical measures for the melody. Because there is only one calculated value for each metric for the melody, N for the melody may equal one and the standard deviation s for the melody may be zero.

Proceeding to step 1530, processor(s) 121 may generate intermediate variables using the statistical measures generated at steps 1510 and 1520, described above. For each metric for which one or more statistical measures were generated at steps 1510 and 1520, processor(s) 121 may determine the difference in means, denoted as $\Delta \bar{x}$, for the metric, using Equation (3) described above, where $\bar{x}_1$ refers to the mean of the metric for the musical genre, and $\bar{x}_2$ refers to the mean of the metric for the melody, which is equal to the calculated value of the metric for the melody.

Using the intermediate variables generated at step 1530, processor(s) 121 may determine at step 1540 whether the differences between the musical genre and the melody are significant. For example, processor(s) 121 may, for each metric, examine the difference in means between the musical genre and the melody, and determine whether the difference is significant. Put another way, processor(s) 121 may determine the probability that the means for the musical genre for a given metric are significantly different at a given confidence level, such as the 90%, 95%, or 99% confidence levels. Additional statistical tools may be used to make this determination. For example, in some embodiments, processor(s) 121 may calculate the t-statistic using Equation (6) above and compare t with the critical t-statistic, denoted as t*, where t* may be obtained from publicly available statistical distribution tables, as described above in connection with step 1040. If the t-statistic is greater in value than the critical t-statistic (i.e., if t>t*), processor(s) 121 may determine that the means between the musical genre and the melody are significantly different at the chosen confidence level, and therefore the melody is not classified into the musical genre. Alternatively, statistical methods, tests, and formulas other than the t-statistic test may be used to determine whether a difference between the musical genre and the melody is significant, and whether to classify the melody in the musical genre. Processor(s) 121 may repeat process 216 for one or more other musical genres to determine within which musical genres to classify the melody.

Figure 16:
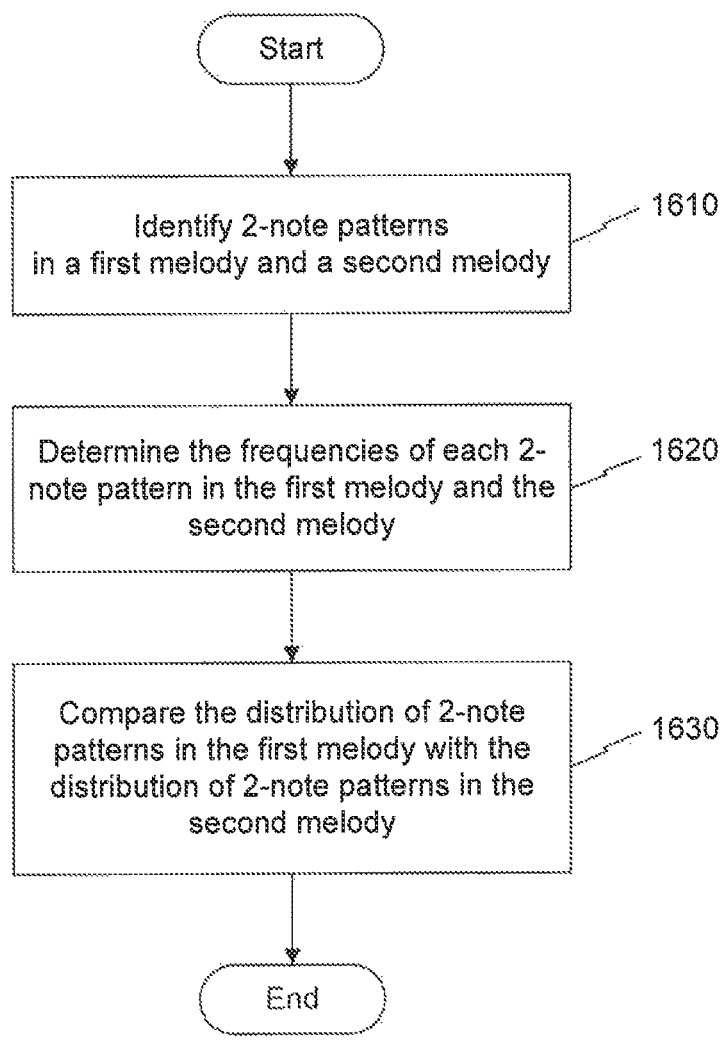
FIG. 16 is a flowchart of an exemplary process for comparing melodies, consistent with disclosed embodiments.

FIG. 16 illustrates process 218 for comparing melodies to determine similarities and differences between melodies. For example, process 218 may include analyzing pattern distributions in two melodies to determine whether one or more portions of one of the melodies are similar to one or more portions of the other melody, as described below.

At step 1610, processor(s) 121 may identify 2-note patterns in a first melody and a second melody. For example, if the first melody is "Baa, Baa, Black Sheep," processor(s) 121 may determine that the first melody includes the 2-note patterns identified for melody "0" shown in FIG. 8. Processor(s) 121 may also identify the 2-note patterns in the second melody for comparing to "Baa, Baa, Black Sheep."

At step 1620, processor(s) 121 may determine the frequencies (the number of times the 2-note patterns occur) of the 2-note patterns in the first and second melodies. For example, if the first melody is "Baa, Baa, Black Sheep," processor(s) 121 may determine that the frequency for the 2-note pattern (0, 1.0) is 16, the frequency for the 2-note pattern (7, 1.0) is one, the frequency for the 2-note pattern (−2, 4.0) is two, etc. The frequencies of the 2-note patterns in each melody may indicate a distribution of the 2-note patterns in the melody. The distribution for each melody may be mapped graphically in a frequency diagram that identifies the patterns on the x-axis and the frequencies on the y-axis.

At step 1630, processor(s) 121 may compare the distributions of the 2-note patterns in the first and second melodies. The comparison may involve a statistical analysis of the distributions of the 2-note patterns in the respective melodies using a parametric sample test or non-parametric sample test. For example, processor(s) 121 may apply a non-parametric sample test, such as the Kolmogorov-Smirnov test, to compare the distribution of 2-note patterns in the first and second melodies to determine whether the first and second melodies are similar.

Alternatively, processor(s) 121 may compare portions of the melodies to determine whether portions of the first melody and the second melody are similar. For example, processor(s) 121 may identify patterns with a relatively large number of notes, such as 6, 7, 8, 9, and/or 10 notes, in the first melody. Processor(s) 121 may determine if the patterns with a relatively large number of notes identified in the first melody are also in the second melody. As a result, processor(s) 121 may identify if a portion of the first melody is embedded in the second melody. Also, instead of comparing the two melodies, processors) 121 may determine if the patterns with a relatively large number of notes identified in the first melody are also in any other melody stored in database(s) 130 to determine if the relatively large pattern in the first melody is found in any other melody in database(s) 130.

In another example, processor(s) 121 may identify patterns with an intermediate number of notes, such as 4 and/or 5 notes, in the first melody. Processor(s) 121 may determine if a combination (e.g., a pair) of the 4- and/or 5-note patterns are included in the second melody. As a result, processor(s) 121 may identify if a portion of the first melody is the same as the second melody even if there has been a relatively minor change, such as a break in the middle of a relatively large (e.g., 10-note) pattern. Also, instead of comparing the two melodies, processor(s) 121 may determine if the combinations of 4- and/or 5-note patterns identified in the first melody are also in any other melody stored in database(s) 130 to determine if the patterns in the first melody are found in any other melody in database(s) 130.

The statistical tests and formulas described herein may be applied under the assumption that the underlying distribution of the data is normally distributed, e.g., similar to a bell curve. To the extent the underlying data may have a different distribution, different statistical methods, tests, and formulas may apply. For example, if the underlying distribution is unknown, non-parametric statistics may apply. The t-statistic test described above is provided as an example to illustrate how the exemplary processes may apply to a particular distribution of data and does not limit in any way the exemplary processes for other distributions of data.

The disclosed embodiments provide systems and methods for analyzing musical compositions that may provide insights and observations into musical genres and patterns. One example of such analysis involves deconstructing a musical composition into its constituent melody and analyzing the notes that make up the melody. Melody analysis, in conjunction with statistical tools and analysis, may be used for comparing differences between musical genres and melodies, for identifying unique patterns across melodies, for classifying melodies into musical genres, and for other applications.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer readable media, such as secondary storage devices, for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Python, Objective-C, HTML, HTML/AJAX combinations, XML, or HTML with included Java applets. One or more of such software sections or modules can be integrated into a computer system, e-mail, or browser software.

Moreover, while illustrative embodiments have been described herein, the scope of any and all embodiments having equivalent elements, modifications, omissions, combinations (e.g., of aspects across various embodiments), adaptations and/or alterations as may be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for identifying a unique pattern in a melody, the system comprising:
   a memory device storing software instructions;
   a database storing:
      a plurality of melodies;
      a plurality of 2-note patterns stored in association with the plurality of melodies, wherein each 2-note pattern of the plurality of 2-note patterns comprises a pitch differential and a duration ratio for two consecutive notes in at least one of the plurality of melodies; and
      at least one metric stored in association with the plurality of 2-note patterns; and a processor configured to execute the software instructions to:
  read, from the database, frequency data for the plurality of 2-note patterns stored in the database;
  determine, from the frequency data, a subset of the 2-note patterns, wherein each 2-note pattern in the subset appears in only one of the plurality of melodies stored in the database; and
  determine, based on the subset of 2-note patterns, a subset of the melodies stored in the database, wherein each melody in the subset is identified as having a unique 2-note pattern.

2. The system of claim 1, wherein the database stores at least one melody identification number and location information in association with the at least one of the plurality of 2-note patterns.

3. The system of claim 1, wherein:
the subset of the melodies is a first subset,
the database stores a plurality of 3-note patterns stored in association with the plurality of melodies, wherein each 3-note pattern of the plurality of 3-note patterns comprises two pitch differentials and two duration ratios for three consecutive notes in at least one of the plurality of melodies, and
the processor is further configured to:
  read, from the database, frequency data for the plurality of 3-note patterns stored in the database;
  determine, from the frequency data, a subset of the 3-note patterns, wherein each 3-note pattern in the subset appears in only one of the plurality of melodies stored in the database; and
  determine, based on the subset of 3-note patterns, a second subset of the melodies stored in the database, wherein each melody in the second subset is:
    not included in the first subset of the melodies; and
    identified as having a unique 3-note pattern.

4. The system of claim 1, wherein:
the subset of the melodies is a first subset,
the database stores a plurality of n-note patterns stored in association with the plurality of melodies, wherein each n-note pattern of the plurality of n-note patterns comprises n−1 pitch differentials and n−1 duration ratios for n consecutive notes in at least one of the plurality of melodies, wherein n is an integer greater than 3, and
the processor is further configured to:
  read, from the database, frequency data for the plurality of n-note patterns stored in the database;
  determine, from the frequency data, a subset of the n-note patterns, wherein each n-note pattern in the subset appears in only one of the plurality of melodies stored in the database; and
  determine, based on the subset of n-note patterns, a second subset of the melodies stored in the database, wherein each melody in the second subset is:
    not included in the first subset of the melodies; and
    identified as having a unique n-note pattern.

5. The system of claim 1, wherein the frequency data for the plurality of 2-note patterns identifies the number of times each 2-note pattern appears in the melodies stored in the database.

* * * * *